(12) United States Patent
Fujisawa et al.

(10) Patent No.: US 8,425,329 B2
(45) Date of Patent: Apr. 23, 2013

(54) GAME SYSTEM, PROGRAM FOR GAME SYSTEM AND INFORMATION RECORDING MEDIUM

(75) Inventors: Jin Fujisawa, Tokyo (JP); Takashi Anzai, Tokyo (JP); Kyoko Yamazaki, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 0 days.

(21) Appl. No.: 13/276,623

(22) Filed: Oct. 19, 2011

(65) Prior Publication Data
US 2012/0108344 A1    May 3, 2012

(30) Foreign Application Priority Data
Oct. 28, 2010    (JP) .................................. 2010-241734

(51) Int. Cl.
A63F 9/24    (2006.01)
(52) U.S. Cl.
USPC .............................................. 463/42; 463/31
(58) Field of Classification Search ............ 463/31, 463/42
See application file for complete search history.

(56) References Cited

U.S. PATENT DOCUMENTS

| | | | | |
|---|---|---|---|---|
| 7,594,847 | B1 * | 9/2009 | York et al. ........................ | 463/5 |
| 7,632,186 | B2 * | 12/2009 | Spanton et al. ................. | 463/40 |
| 8,012,016 | B2 * | 9/2011 | York et al. ...................... | 463/31 |
| 2004/0143852 | A1 * | 7/2004 | Meyers .......................... | 725/133 |
| 2009/0280908 | A1 * | 11/2009 | Carroll et al. ................... | 463/42 |
| 2010/0075761 | A1 * | 3/2010 | Lord et al. ...................... | 463/43 |
| 2010/0105484 | A1 * | 4/2010 | Horneff et al. .................. | 463/43 |
| 2010/0311483 | A1 * | 12/2010 | Fields et al. ..................... | 463/2 |
| 2011/0111859 | A1 * | 5/2011 | Fiedler ............................ | 463/42 |
| 2011/0118033 | A1 * | 5/2011 | Fiedler ............................ | 463/42 |
| 2011/0201423 | A1 * | 8/2011 | Borst et al. ...................... | 463/31 |
| 2011/0269540 | A1 * | 11/2011 | Gillo et al. ...................... | 463/31 |
| 2012/0071244 | A1 * | 3/2012 | Gillo et al. ...................... | 463/42 |
| 2012/0115597 | A1 * | 5/2012 | Waugaman et al. ............ | 463/31 |
| 2012/0129600 | A1 * | 5/2012 | Ealey .............................. | 463/31 |

FOREIGN PATENT DOCUMENTS

JP        2004-105444        4/2004

OTHER PUBLICATIONS

"Battlefield 1943 Primer Guide" written by Andre Segers, published by Gamespot.com, accessible on or before Jul. 27, 2009, and retrieved from URL <http://www.gamespot.com/features/battlefield-1943-primer-guide-6214209/> on Jun. 25, 2012, 12 pages.*

(Continued)

*Primary Examiner* — Dmitry Suhol
*Assistant Examiner* — Jason Skaarup
(74) *Attorney, Agent, or Firm* — Greenblum & Bernstein, P.L.C.

(57) ABSTRACT

The present invention aims at facilitating reconstruction of a party after game over to avoid wastefulness in time required for party construction. Moreover, the present invention aims at hastening user to reconstruct a party thus to improve real thrill of an on-line game. The present invention essentially relates to an on-line game system in which user of the game performs display on a display part so that resurrection points of other characters included within the party can be selected. In the present invention, since resurrection points of other characters included within the party can be also selected and restored, wastefulness in time required for gathering with each other around one location for the purpose of reconstructing a party can be avoided. Thus, it is possible to hasten reconstruction of the party.

20 Claims, 5 Drawing Sheets

OTHER PUBLICATIONS

"Battlefield 2" Game Manual written by Electronic Arts, available on or before Dec. 31, 2005, 25 pages.*

"Battlefield 1943" review written by Ben Dutka, accessible on or before Jul. 14, 2009, at URL <http://www.psxextreme.com/scripts/ps3-reviews/review.asp?revID=260>, 2 pages.*

"Dominion ReSpawn Explained," published on or before Oct. 31, 2011 and retrieved from URL <http://forum.mmosite.com/thread/2/93/20111031/Dominion_Respawn_Explained-4eaf7097b8d060b13-1.html>, 4 pages.*

U.S. Appl. No. 13/276,755 to Jin Fujisawa et al., which was filed on Oct. 19, 2011.

* cited by examiner

GAME SYSTEM, PROGRAM FOR GAME SYSTEM AND INFORMATION RECORDING MEDIUM

TECHNICAL FIELD

The present invention relates to an on-line game system through an information communication network.

BACKGROUND ART

Hitherto, there has been known an on-line game system in which client computers are connected to a game server computer through an information communication network (Japanese Patent Application Laid Open No. 2004-105444). In such a game system, many and unspecified users who operate clients can enjoy within virtual spaces which are set in the game server.

Moreover, as a form of the on-line game, there are known Massively Multiplayer Role-Playing-Games (MMORPGs). In general MMORPGs, player characters that many and unspecified users manipulate are active within virtual spaces which are provided by the game server. Further, users cooperate with each other to attain various and versatile problems provided by the game server.

In such MMORPGs, player character is ordinarily placed in game over state in the case where any task which has been set cannot be attained. As the condition of the game over, various conditions are conceivable. For example, when hit point (HP) parameter of player character becomes equal to zero, it is assumed that the condition of task cannot be attained. Further, when hit point (HP) parameter of a player character manipulated by a client becomes equal to zero, the progress of the game of the player character retroacts back to a certain point (resurrection point). Data relating to the resurrection points are stored in advance in each storage part of clients or the game server every player characters. Thus, resurrection points of respective player characters are read out from the storage part with the fact that the game over condition is satisfied being as motivation so that the progresses would be retroactive every player characters.

PRIOR ART REFERENCE

Patent Reference

[Patent reference 1] Japanese Patent Application Laid Open No. 2004-105444

SUMMARY OF THE INVENTION

Problems to be Solved

In such MMORPGs as described above, there is generally employed such a scheme to constitute a party by a plurality of player characters so that player characters within the party cooperate with each other to aim at attaining the objects while intimately communicating with each other. However, in conventional MMORPGs, when player character included within a party is placed in game over state, player characters included within the party are respectively restored at own resurrection points. Namely, in conventional MMORPGs, even in the case where a party is constituted by a plurality of player characters, points to be restored after game over were different every player characters.

As described above, when resurrection points of player characters included within a party are different from each other, in such a case to aim at forming a parry by the same members for a second time to overcome problems, player characters must be moved from respective own resurrection points within a virtual space to rendezvous of the party. Such move from resurrection points to the rendezvous resulted in wastefulness in time within an actual world.

Moreover, in MMORPGs, there is the real thrill in that respective users can form a party, and can aim at solving the problems while cooperating with each other every party. However, when player characters are restored at resurrection own points every time all player characters within the party are placed in game over state, any other user feels troublesome in reconstructing a party together with any other user so that interestingness of the on-line game itself would be disadvantageously would be lost.

In view of the above, an object of the present invention is to simplify reconstruction of a party after game over to avoid wastefulness in time for constructing a party. In addition, another object of the present invention is to hasten user to reconstruct a party to improve real taste of an on-line game.

Means for Solving the Problems

In the present invention, user of a game essentially performs a display, on a display part of a client, so that the user of the game can also select resurrection points of other characters included within a party. Thus, since resurrection points of other characters can be also selected with respect to resurrection points of respective characters included within the party, it is possible to avoid wastefulness in time required for gathering with each other around one location for the purpose of reconstructing a party. At the same time, since there results motivation for party reconstruction, the possibility that interesting of the on-line game may be lost would be eliminated.

The first aspect of the present invention relates to an on-line game system using a computer connected through an information communication network, in which characters existing within a virtual space provided by a game server are subjected to input manipulation by an input part of the client.

The game system according to the present invention includes a party storage part, a condition storage part, a resurrection point storage part, a determining part, a resurrection point extracting part and a resurrection point display part.

The party storage part serves to store party information relating to a party within which a plurality characters are included.

The condition storage part serves to store therewithin a condition where a party is placed in game over state.

The resurrection point storage part serves to store therewithin respective resurrection points included within a party.

The determining part serves to determine by making reference to the party storage part and the condition storage part as to whether or not a game over condition where the party is placed in game over state is satisfied.

The resurrection point extracting part serves to extract a resurrection point of a character included within a party from the resurrection point storage part in the case where it is determined by the determining part that the game over condition is satisfied.

The resurrection point display part serves to display a resurrection point extracted by the resurrection point extracting part on the display part of a client which performs input manipulation of characters included within a part to hasten usr of the game to select resurrection points.

As described above, since the present invention employs a scheme to hasten users of a game to select resurrection points from resurrection points of all characters included within a part, user can restore even resurrection points of any other player. Accordingly, there can be avoided troublesomeness such that respective characters gather with each other at one location for reconstructing the party, leading to economy of real time. Moreover, since it becomes easy to reconstruct a party, it is possible to promote to play a game in which the party is constructed. Thus, real taste of the game can be improved.

In the game system according to the present invention, it is preferable that the resurrection point display part serves to display a resurrection point, at which character is subjected to input manipulation by a client, having gained experience among resurrection points extracted by the resurrection point extracting part on the display part of the client to hasten user of the game to select resurrection points having gained experience. Namely, in MMORPGs, a specific point within a virtual space provided by the game server can result in resurrection point. The game server or respective clients is or are adapted to store a certain point where a character has been reached within the virtual space.

Thus, the present invention permits user to make a play along scenario of a game thus to have ability to sustain interest with respect to the game of user.

It is preferable that the game system according to the present invention further includes a text information display part for displaying, on a display part of the client which performs input manipulation of characters included within a party, text information inputted by input parts of respective clients for a time period during which a display to hasten selection of resurrection points is made on a display part of a client.

By employing such a configuration, the present invention can determine resurrection points of respective characters included within a party by chat while consulting between users within the party. Accordingly, even in the case where there results game over as the entirety of the party, it is possible to promote to more degree reconstruction of the party for a second time.

It is preferable that the game system according to the present invention further includes judging means, a game processing part and a resurrection processing part.

The judging means serves to judge as to whether or not resurrectable points inputted and selected by input parts of respective clients which performs input manipulation of characters included within a party coincide with each other.

The game processing part executes a game for determining one winner among a plurality of characters included within the party in the case where it is judged by the judging means that resurrectable points coincide with each other.

The resurrection processing part serves to restore characters included within a party at a resurrection point inputted and selected by the input part of the client which manipulates a character which is a winner of a game executed by the game processing part.

By employing such a configuration, the present invention can determine, by the game, resurrection points of characters included within a party in the case where resurrection points determined by users included within the party do not all coincide with each other. As described above, resurrection points included within the party can be unified by the game. For this reason, there may result in motivation for reconstructing a party. Moreover, even after main, i.e., master game in which users participate is placed in game over state, user can enjoy game as slave game (mini game). For this reason, it is possible to take interest or concern of user.

The second aspect of the invention relates to a program for an on-line game system using a computer connected through an information communication network, in which characters existing within a virtual space provided by a game server are subjected to input manipulation by input parts of clients.

The program according to the present invention is adapted to allow the computer to operate as a computer including party storage means, condition storage means, resurrection point storage part, determining means, resurrection point extracting means, and resurrection point display means.

The party storage means is means for storing party information relating to a party within which a plurality of characters are included.

The condition storage means is means for storing a condition where the party is placed in game over state.

The resurrection point storage part is means for storing respective resurrection points included within a party.

The determining means is means for determining, by making reference to the party storage means and the condition storage means, as to whether or not there is satisfied a game over condition where the party is placed in game over state.

The resurrection point extracting means is means operative when it is determined by the determining means that the party is placed in game over state, it serves to extract resurrection points of characters included within a party from the resurrection point storage part.

The resurrection point display part is means for displaying resurrection points extracted by the resurrection point extracting part on display parts of clients which performs input manipulation of characters included within a party to hasten user of the game to select resurrection points.

The third aspect of the present invention relate to a computer readable information recording medium in which the program for game system according to the second aspect of the present invention is stored.

Effects/Advantages of the Invention

By employing the configuration as described above, the present invention is adapted to simplify reconstruction of the party after game over to thereby have ability to avoid wastefulness in time for party construction, and to have ability to hasten user to reconstruct a party to improve real thrill of the on-line game.

BEST MODE FOR CARRYING OUT THE INVENTION

Preferred embodiments according to the present invention will now be described. It should be noted that the present invention is not limited to embodiments described below. Namely, the present invention includes a scope within which modifications/changes are made as occasion demands within the scope within which the person skilled in the art is self-explanatory from the preferred embodiments described below.

Figure 1:
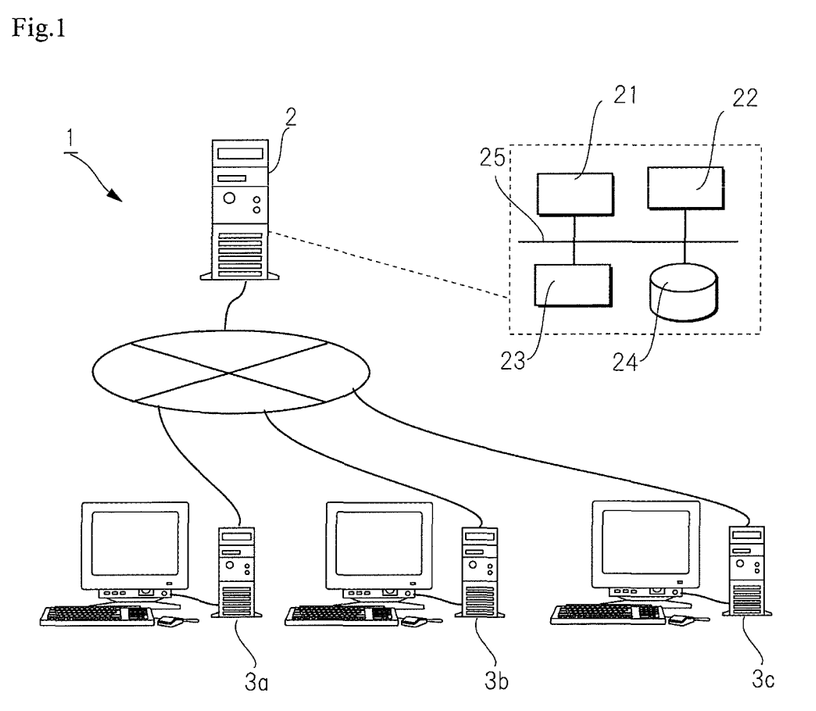
FIG. 1 is a block diagram of a game system according to the present invention.

FIG. 1 is a block diagram of a system for realizing a game system 1 according to the present invention. As shown in FIG. 1, the system 1 of the present invention includes a server 2 and clients 3. The server 2 is connected to a plurality of clients 3 through a communication network such as Internet, etc. The server 2 is a game server providing a virtual space, and can perform download or streaming distribution of game programs with respect to the clients 3 through the communication network. In the client 3, there are stored programs for performing download and/or streaming distribution of game programs from the server 2. There may exist a plurality of servers 2.

As shown in FIG. 1, the server 2 includes an input/output part 21, a control part 22, an arithmetic processing part 23 and a storage part 24, wherein these components are connected by way of a bus 25, etc. so that transmission/reception of information can be performed. In this embodiment, for example, work areas of the control part 22, the arithmetic processing part 23 and the storage part 24 of the server may function as a party storage part 10, a condition storage part 11, a resurrection point storage part 12, a determining part 13, a resurrection point extracting part 14, a resurrection point display part 15, a text information display part 16, a judging part 17, a game processing part 18 and a resurrection processing part 19. When a predetermined information is inputted from the input/output part 11, the control part 12 serves to read out control program stored in a main memory of the storage part 14. Further, the control part 12 serves to read out data stored in the storage part 14 as occasion demands in accordance with command of the control program to perform a predetermined operation at the arithmetic processing part 13. In addition, the control part 12 serves to temporarily store computational result into the storage part 14 to output information from the input/output part 11.

Figure 2:
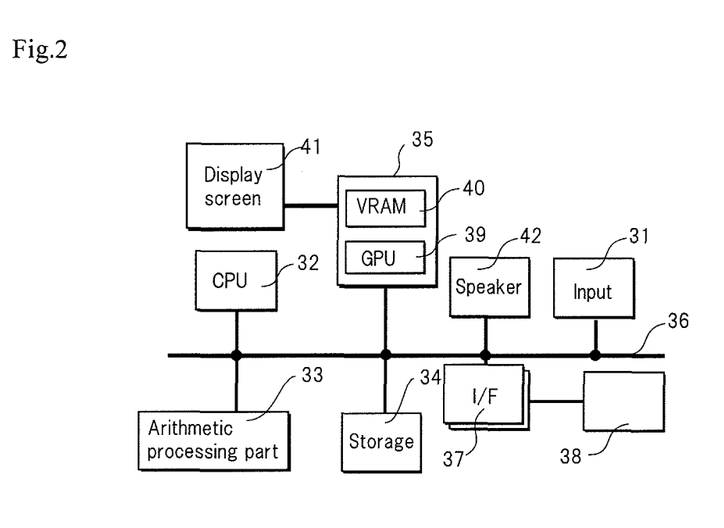
FIG. 2 is a block diagram showing a hard ware configuration of a client in the present invention.

FIG. 2 is a block diagram showing an example of the hardware configuration of each client 3. The client 3 includes an input part 31, a CPU 32, an arithmetic processing part 33, a storage part 34 and an image processing block 35. Further, respective components are connected so that transmission/reception of information can be performed by way of a bus 36. Further, this game system is connected to an interface (I/F) 37 through the bus 36. For this reason, e.g., this game system can be connected to an information recording medium 38 in which programs are stored through the I/F 37. The programs stored in the information recording medium 38 serve to allow computer or image processing part to function as a predetermined means. In addition, these programs serve to allow computer or image processing part to execute predetermined steps. It is to be noted that memory connected through the I/F 37 may function as the entirety or a part of the storage part 24.

The image processing block 35 includes a graphic processing unit (GPU) 39 and a video RAM (VRAM) 40. Further, the GPU 39 and the VRAM 40 are connected in order to permit transmission/reception of information. In FIG. 2, reference numeral 41 designates a display part (monitor), and reference numeral 42 designates a speaker.

In this embodiment, for example, work areas of the CPU 32, the arithmetic processing part 33 and the storage part 34 of the client, and the program for game stored in the information recording medium 38 of the client may function as the party storage part 10, the condition storage part 11, resurrection point storage part 12, the determining part 13, the resurrection point extracting part 14, the resurrection point display part 15, the text information display part 16, the judging means 17, the game processing part 18 and the resurrection processing part 19. In the case where operating information is inputted from the input part 31, the operating information is transmitted to the CPU 32 through the bus 36. Thus, the CPU 32 serves to read out programs stored in the information recording medium 38 to perform a predetermined processing. The CPU 32 serves to read out various information stored in the storage part 34 and/or the information recording medium 38 in accordance with command from the program to perform a predetermined operation at the arithmetic processing part 33. The CPU 32 serves to store computational result into the storage part 34 as occasion demands to output suitable information from a monitor 41 or a speaker 42 by using the computational result.

Figure 3:
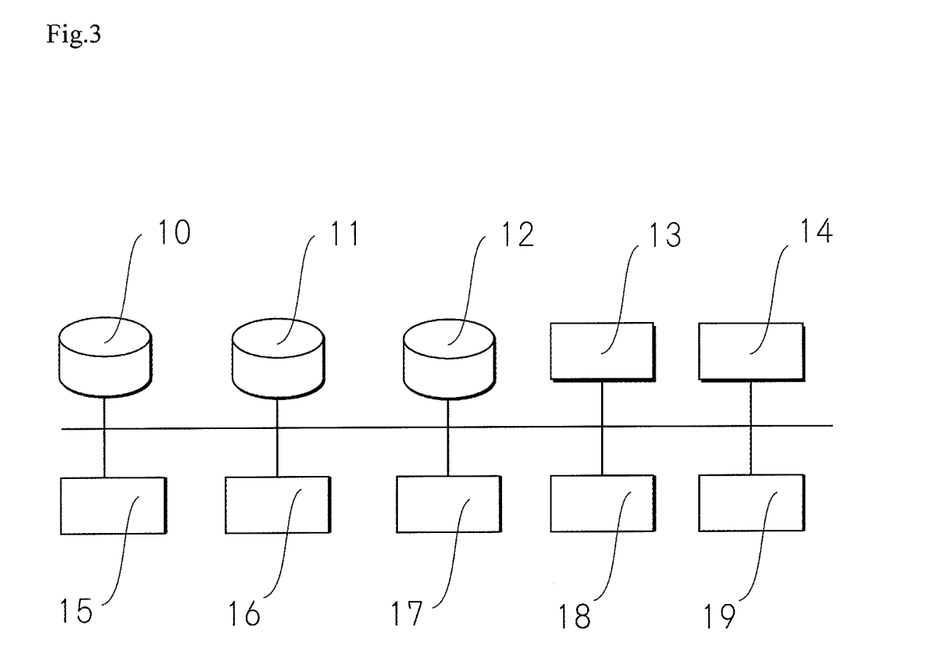
FIG. 3 is a block diagram of the game system according to the present invention.

FIG. 3 is a block diagram of a game system according to the present invention. The game system according to the present invention includes party storage part 10, condition storage part 11, resurrection point storage part 12, determining part 13, resurrection point extracting part 14, resurrection point display part 15, text information display part 16, judging means 17, game processing part 18 and resurrection processing part 19. These respective components are connected so that transmission/reception of information can be performed through the bus. It is to be noted that these components are connected by either the sever 2 or the clients 3 constituting the game system.

The party storage part 10 is adapted so that there are stored party information relating to party in which a plurality of characters are included. The characters are generated by the image processing part, and are displayed on the display screen 41 of the client 3. The characters are subjected to input manipulation by input parts of respective clients 3, and act within a virtual space provided by the game server. Moreover, the party means group or faction including characters, and player which manipulates character can arbitrarily collect other players to constitute a party. It is to be noted that party may be constituted by single character in the computer processing. Moreover, the number of characters constituting the party may be varied as occasion demands in accordance with the progress of the game. The party information are stored in the party storage part 11 in such a manner that one or plural character IDs or player IDs included within a party are associated therewith.

The game system according to the present invention may include a storage part for storing characters IDs or player IDs in addition thereto. In general game systems, a plurality of ID information may be stored. In the case of the game system related to the member's system web site, member's No. of the web site may be used as ID information. Moreover, e.g., ID information assigned in order of joining of member may be used. In this case, in general, a part of data base of the server functions as ID information storage part. Further, in the case where the game system is the card game system and utilizes private card, there may be used ID information assigned to a card indicating player ID or character ID.

The condition storage part 11 serves to store a condition where the party is placed in game over state. The condition where the party is placed in game over state is set as occasion demands every scenario or task of the game, for example, as in the case where HP parameters of all characters included within a party become equal to zero, in the case where HP of a specific character within a party becomes equal zero, in the case where limit time which is set for attaining the task is passed, and in the case where a specific object within a game is broken by enemy character. Moreover, the condition storage part 11 may store a condition where character is placed in game over state as in the case where the HP parameter becomes equal zero to store, as game over condition, the fact that all characters included within a party are placed in game over state. It is to be noted that there may be employed such a scheme to store clear condition every scenario or task of the game into the condition storage part 11 to set the case where such clear condition is not satisfied as game over condition.

The resurrection point storage part 12 serves to store resurrection points of respective characters included within a party. The resurrection points referred to here mean points within a virtual space where the progress of the game of player characters is last updated (saved), and are stored in a memory part (including memory connected through I/F) of the clients or the game server. In general RPGs, a save point at which the progress of the game of player characters can be updated is limited to a specific location. Further, when player character is placed in game over state, the player character is restored at a save point at which update of the progress has been last performed. In the specification, such save point at which update of the progress has been last performed is called resurrection point.

The resurrection point storage part 12 serves to store resurrection point with respect to characters included within a party. In concrete terms, the resurrection point storage part 12 serves to store information relating to resurrection point in such a manner associated with IDs which are set every characters or IDs which are set every players which manipulate characters. As an example of information relating to resurrection point, there are enumerated name of resurrection point, x, y coordinate values of a field within a virtual space and/or ID information such as street or church, etc. existing within a virtual space.

The determining part 13 serves to determine, by making reference to the party storage part 10 and the condition storage part 11, as to whether or not game over condition where party is placed in game over state is satisfied. In concrete terms, the determining part 13 serves to specify respective characters included within a party by making reference to the party storage part 10. Further, the determining part 13 serves to determine, on the basis of information relating to characters included within a party, by making reference to the condition storage part 11, as to whether or not a certain party satisfies the game over condition. The determining part 13 serves to determine game over condition, e.g., on the basis of HP parameters of characters included within a party. Further, the determining part 13 may serve to determine, by making reference to the party storage part 10 and the condition storage part 11, as to whether or not all characters included within a party satisfy the game over condition.

The resurrection point extracting part 10 is operative so that when the determining part 13 has determined that the game over condition is satisfied, it serves to extract information relating to resurrection point of characters included within a party from the resurrection point storage part 12. For example, in the case where the storage part of a client functions as resurrection point storage part 12, the resurrection point extracting part 14 serves to provide access to a memory part of a client which manipulates character included within a party to read out a location of resurrection point of character and/or name of resurrection point to temporarily store its result at the server. This processing is performed with respect to all clients which manipulate characters included within the party to collect information relating to resurrection points of all characters included within the party.

The resurrection point display part 15 serves to display information relating to resurrection points of characters extracted by the resurrection point extracting part 14 on respective screens of clients which perform input manipulation of characters included within a party. Thus, the resurrection point display part 15 serves to hasten user of the game to select resurrection points.

Figure 4:
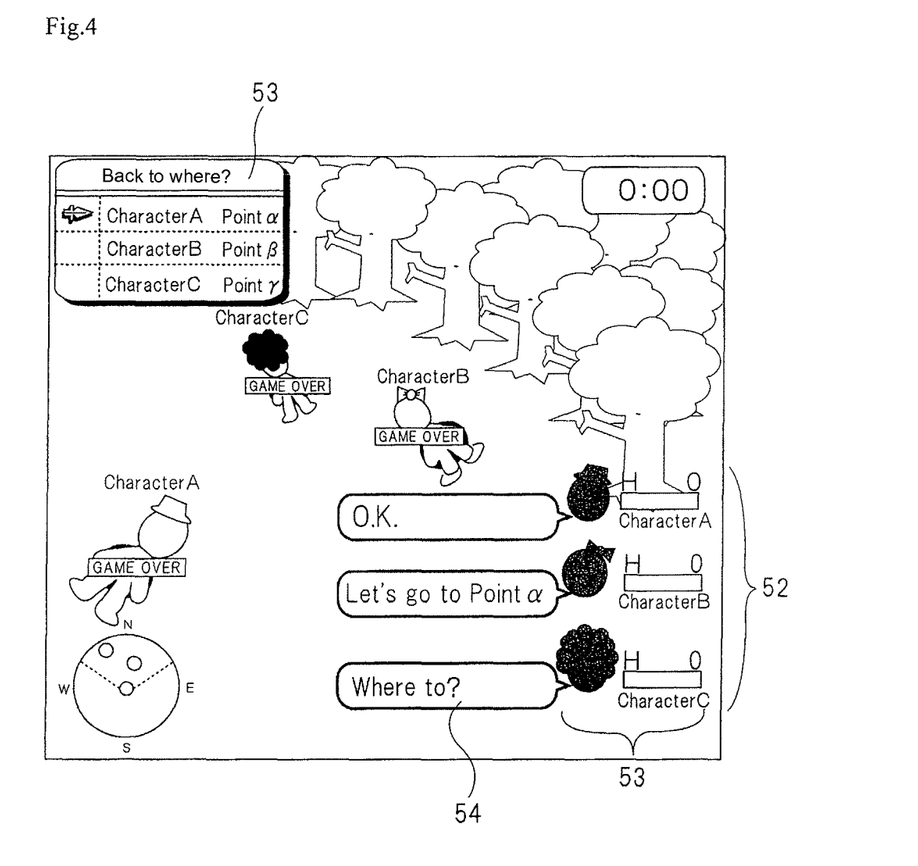
FIG. 4 is a diagram for explaining a display screen of a client.

FIG. 4 shows an example of an image in which information 51 relating to resurrection points is displayed on the display screen of the client. FIG. 4 shows an example in which character A, character B and character C are stored in the party storage part 10 in such a manner that they construct a party. Moreover, in the example of FIG. 4, there are displayed names of characters (chara A, chara B and chara C) and names of resurrection points (point α, point β and point ν) at the right and upper part of the display screen. Further, text of "Back to where ?" is displayed thus to hasten player of a game to select resurrection point.

The resurrection point display part 15 serves to display only resurrection point in which character subject to input manipulation by a client has gained experience among resurrection points extracted by the resurrection point extracting part 14 on a display part of the client. Thus, user of the game is hastened to make selection of next resurrection point among resurrection points having gained experience. Namely, the resurrection point display part 15 serves to select a resurrection point at which character has gained experience among the extracted resurrection points to display the resurrection point thus selected on the display part of the client. Accordingly, even if any resurrection point is stored in the resurrection point storage part as resurrection point of any other character, it is not displayed on the display part of a client which manipulates character having no gained experience at the resurrection point.

Resurrection points at which character has been reached are gradually increased in accordance with the progress of the game. Information relating to resurrection point at which respective characters have been reached are stored in the memory part of the clients or the server. Namely, the game proceeds. Thus, when character gains a new resurrection point, there is stored the fact that its character has gained the new resurrection point. In this way, information relating to resurrection points having gained experience with respect to respective characters are stored in the storage part of the client or the server. Further, the resurrection point display part 15 serves to judge, by making reference to the storage part, as to whether or not a corresponding resurrection point is resurrection points having gained experience with respect to respective characters included within a party among resurrection points extracted by the resurrection point extracting part 14 to display only a resurrection point or resurrection points having gained experience on the display part of the respective clients.

Figure 5:
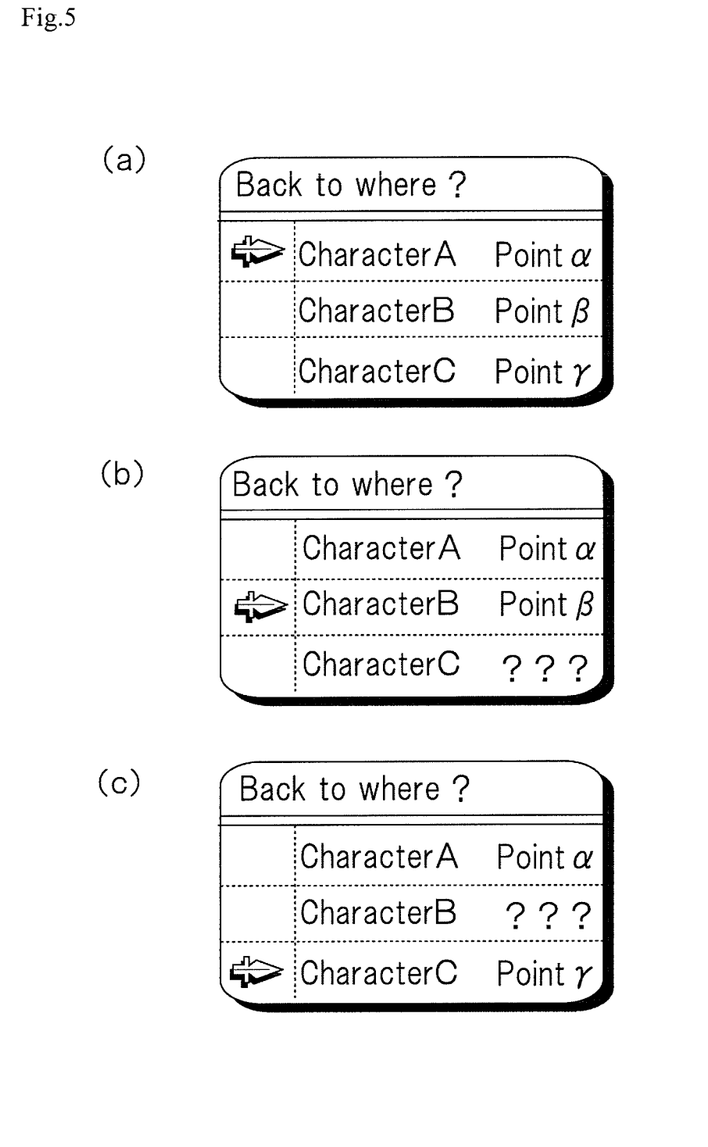
FIG. 5 is a diagram for explaining a display screen of a client.

FIG. 5 is a diagram showing an example of display of information relating to resurrection points displayed on display parts of respective clients constituting a party. For example, FIG. 5(a) shows information relating to resurrection points displayed on the display part of a client 3a, FIG. 5(b) shows information relating to resurrection points displayed on the display part of a client 3b, and FIG. 5(c) shows information relating to resurrection points displayed on the display part of a client 3c. In this example, chara A, chara B and chara C respectively designate names of characters subjected to input manipulation by the client 3a, the client 3b and the client 3c, wherein a party is constituted by the chara A, chara B and chara C. Here, the chara A has gained experiences also at the point β and the point ν which are resurrection points of the chara B and the chara C. Accordingly, as shown in FIG. 5(a), point α, point β and point ν are displayed on the display part of the client 3a which manipulates the chara A. On the other hand, the chara B has gained experience at the point α which is resurrection point of the chara A, but has non-attainment at the point ν which is resurrection point chara C. Accordingly, as shown in FIG. 5(b), only point α and point β are displayed on the display part of the client 3B which manipulates chara B. Similarly, the chara C has gained experience in the point α which is resurrection point of the chara A, but has non-attainment at the point β which is resurrection point of the chara B. Accordingly, as shown in FIG. 5(c), only the point α and the point ν are displayed on the display part of the client 3c which manipulates the chara C.

The text information display part 16 serves to display text information inputted by input parts (keyboard, etc.) of respective clients included within a party on display screens of the clients and display screens of other clients connected through Internet. Namely, when text information is inputted, the client serves to transmit the inputted text information to the server through the Internet, and to display it on the display part. When the game server receives text information from a client, it serves to transmit its text information to any other client included within the party. The other client which has received text information from the server serves to display the received text information on the display part.

Particularly, the text information display part 16 serves to display text information inputted to a client having party relationship among text information inputted to input parts of respective clients in a manner adjacent to character information. In the character information, there are included face images of characters, names of characters and various parameters relating to the characters.

In FIG. 4, there is shown an example in which character information of respective characters and inputted text information are displayed on the display screen of the client. In FIG. 4, at the right and lower end of the display screen, there are displayed character information 53 of chara A, chara B and chara C. Moreover, in FIG. 4, pop-up display of text information 54 inputted through the input part of a client which manipulates characters is performed at a part adjacent to the left of the character information 53. In this embodiment, after text information 54 is inputted to input parts of respective clients, they are continuously displayed on the display screen for 20 sec. Further, setting is made such that after 20 sec. is passed from a time when the text information 54 is inputted, it disappears from onto the display screen. In this way, game player can consult a resurrection point to be selected through conversation by chat.

The judging means 17 serves to judge as to whether or not resurrectable points inputted and selected by input parts of respective clients which perform input manipulation of characters included within a party coincide with each other. When resurrection point of character included within the party is displayed by the resurrection point display part, user of the game serves to select desired resurrection point from resurrection points displayed on the display part of the client. Information of the resurrection point selected by the user are temporarily stored every clients. Further, the judging means 17 serves to read out information of resurrection point selected every client from the storage part to judge as to whether or not resurrection points selected by the user coincide with each other.

The game processing part 18 serves so that when it is judged by the judging means 17 that resurrectable points selected by user do not coincide with each other, it executes a game for determining one winner among a plurality of characters included within the party. The game processing part 18 serves to read out game control program stored in a memory of the storage part 24 of the game server to execute game processing. It is to be noted that, as the game control program, there may be employed such a game control program stored into a memory connected through I/F of the client and/or such a game control program stored into a memory of client by performing download from the game server.

As a game executed by the game processing part 18, there may be employed a game in which a single winner is determined, but games of various forms are conceivable. The contents of games to be executed are scissors-paper-rock game, dice game, card game, shooter game and fighting game. A processing for executing the game is already known. When winner of the game is determined by the game processing part 18, information relating to a winner of the game is temporarily stored in the storage part.

It is to be noted that the configuration adapted for starting game processing when resurrection points selected by user do not coincide with each other may be arbitrary. There may be employed a configuration such that even when resurrection points selected by user do not coincide with each other, characters are restored at resurrection points selected by respective users. Moreover, there may be also employed a scheme to allow user to select as to whether or not game processing is started for the purpose of causing resurrection points to coincident with each other.

In principle, the resurrection processing part 19 serves to restore characters at resurrection points selected by input parts of clients. Information relating to resurrection points are stored in the resurrection point storage part 12. The resurrection processing part 19 serves to read out information relating to resurrection points from the resurrection point recording part 12 to restore characters at points where resurrection points selected within a virtual space exist. The resurrection processing part 19 may be configured so that, when restoring characters, all parameters (e.g., hit point, experience point, money in hand) of the character are returned to the state of a time point when progress of the game is saved at the resurrection point. Moreover, the resurrection processing part 19 may be configured to maintain the state of parameters at a time point when character is brought into game over to return only a position where the character exist back at resurrection point. Further, the resurrection processing part 19 may be configured to maintain the state at a time point of game over in regard to a specific parameter or parameters, or to change numeral values in regard to other parameters.

On the other hand, in the case of the configuration or setting in which game processing for determining one winner is started when resurrection points selected by user do not coincide with each other, the resurrection processing part 19 serves to store all characters within a party at a resurrection point selected by winner of a game executed by the game processing part 18. In this case, the resurrection processing part 19 performs a processing to read out, from the storage part, resurrection point that a winner of the game determined by the game processing part 18 selects to restore characters included within the party at the resurrection point.

Figure 6:
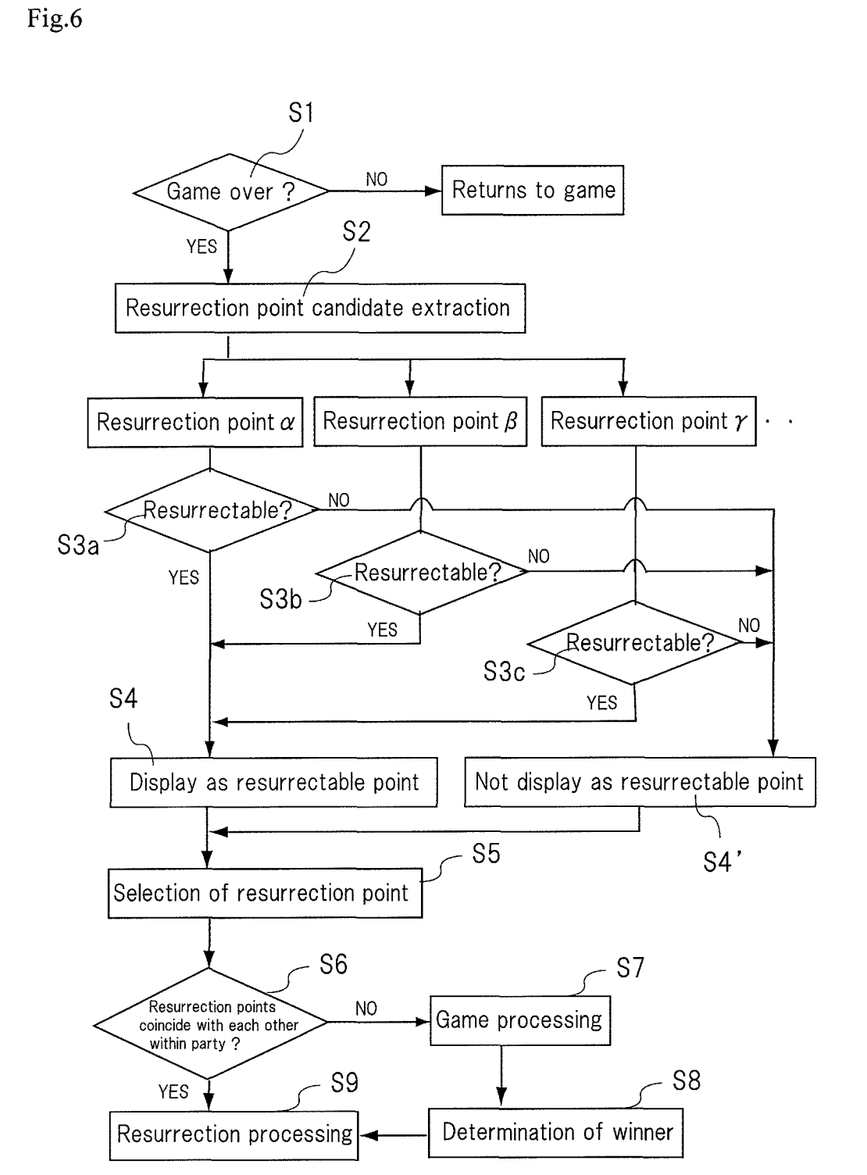
FIG. 6 is a flowchart for explaining an example of the operation of the game system according to the present invention.

The operation of the game system according to this embodiment will now be described with reference to FIG. 6.

The game system serves to specify characters included within a party on the basis of party information stored in the party storage part 10. Further, by the determining part 13, whether or not the game over condition where party is placed in game over state is satisfied is determined on the basis of information relating to characters included within the party by making reference to the game over condition stored in the condition storage part 11 (step S1). For example, the determining part 13 serves so that when HP parameters of all characters included within a party become equal to zero, it is determined that the concerned party is placed in game over state.

When the determining part 13 determines that the condition where the party is placed in game over state is not satisfied, process by the game system returns to a game processing ordinarily executed.

On the other hand, the determining part 14 serves so that when it is determined that the condition where the party is placed in game over state is satisfied, the resurrection point extracting part 14 serves to extract respective resurrection points of characters included within the party from the resurrection point storage part 12 (step S2). In the flowchart of FIG. 6, there is shown an example of the case where three characters are included within the party, and resurrection points are stored as A, B and C with respect to three characters. Accordingly, resurrection points that the resurrection point extracting point 14 extracts from the resurrection point storage part 12 are respectively designated as A, B and C.

Next, the resurrection point display part 15 serves to determine as to whether or not respective characters included within the party can be restored with respect to respective extracted resurrection points by making reference to the storage part in which respective characters store points having gained experience (step S3a, step S3b, step S3c). Namely, the resurrection point display part 15 serves so that when resurrection point at which character has gained experience and resurrection point of a character included within the party coincide with each other, it is determined that the concerned character can be restored with respect to the coincident point. In the flowchart of FIG. 6, it is judged that respective characters included within the party can be restored with respect to A, B and C which are extracted resurrection points.

The resurrection point display part 15 serves to display information of resurrection point in which it is judged that character can be stored on the display part of a client which manipulates its character (step S4). On the other hand, information of resurrection point in which it is judged that character cannot be restored is not displayed on the display part of a client which manipulates its character (step S4').

Next, there is performed such a display to hasten respective users to select a desired resurrection point from resurrection points displayed on the display screen of the client (step S5). Thus, user selects desired resurrection point through the input part from the displayed resurrection points on the basis such display.

When selection of resurrection points is performed by respective users who operate characters included within the party, the judging part 17 serves to judge as to whether or not the selected resurrection points coincide with each other (step S6).

In the case where it is judged by the judging part 17 that resurrection points selected by users which have party relationship coincide with each other, the resurrection processing part 19 executes a predetermined resurrection processing (step S9). For example, the resurrection processing part 19 serves to read out information relating to the resurrection pints from the resurrection point storage part 12 to restore a character at a point where a selected resurrection points exits within the virtual space.

On the other hand, in the case where it is judged by the judging part 17 that resurrection points selected by users which have party relationship do not coincide with each other, the game processing for determining one winner from characters included within the party is executed by the game processing part 18 (step S7). The game processing part 18 serves to determine one winner from characters included within the party on the basis of the result of the game processing which has been executed (step S8).

Further, the resurrection processing part 19 performs a resurrection processing to read out information relating to resurrection points from the resurrection point storage part 12 to restore all characters included within the party at resurrection points selected by players which manipulate characters that the game processing part 18 has determined (step S9).

INDUSTRIAL APPLICABILITY

The present invention can be suitably utilized in game industry and software industry.

DESCRIPTION OF REFERENCE NUMERALS

1 Game system
2 Server
3 Client
10 Party storage part
11 Condition storage part
12 Resurrection point storage part
13 Determining part
14 Resurrection point extracting part
15 Resurrection point display part
16 Text information display part
17 Judging means
18 Game processing part
19 Resurrection processing part
21 Input/Output part
22 Arithmetic processing part
23 Control part
24 Storage part
25 Bus
31 Input part
32 CPU
33 Arithmetic processing part
34 Storage part
35 Image processing block
36 Bus
37 I/F
38 Information recording medium
39 GPU
40 VRAM
41 Display screen
42 Speaker

The invention claimed is:

1. An on-line game system which comprises a game server and at least one computer connected with the game server through an information communication network, in which characters existing within a virtual space provided by the game server are subject to manipulation by clients, the on-line game system comprising:

a party storage for storing party information relating to a party within which the characters are included;

a condition storage for storing a game over condition for which each of the characters in the party is placed in a game over state;

a resurrection point storage for storing a resurrection point for each of the characters included within the party;

a determiner for determining, by making reference to the party storage and the condition storage, whether the game over condition for which the party is placed in the game over state is satisfied;

a resurrection point extractor operative to, when the determiner determines that the game over condition is satisfied, extract the resurrection point of each of the characters included within the party from the resurrection point storage;

a resurrection point display operative to display the resurrection point extracted for each of the characters by the resurrection point extractor on a display of each of the clients, which perform manipulation of the characters included within the party, to hasten a selection of a next resurrection point for each of the characters; and a resurrection processor operative to, after the selection of the next resurrection point for each of the characters, resurrect each character in the party at the next resurrection point.

2. A game system according to claim 1, wherein the resurrection point extractor serves to extract, for each character of the characters, the resurrection point for which the character has gained experience among resurrection points of the characters included within the party and stored in the resurrection point storage.

3. A game system according to claim 1, further including:
a text information display for displaying text information inputted to the clients on the display of each of the clients for a time period during which the resurrection point of each of the characters is displayed.

4. A game system according to claim 1, wherein the resurrection point display is operative to display, on the display of each client of the clients, only the resurrection point of each of the characters for which a corresponding one of the characters of the client has gained experience.

5. A game system according to claim 4, wherein the resurrection point display is operative to display, on the display of each client of the clients, a predetermined symbol instead of the resurrection point of each of the characters for which the corresponding one of the characters of the client has not gained experience.

6. A game system according to claim 1, wherein one of the clients performs the selection of the next resurrection point for each of the characters.

7. A game system according to claim 1, wherein each of the clients performs the selection of the next resurrection point for one of the characters.

8. A game system according to claim 7, further comprising:
a game processor that, when the selection of the next resurrection point by each of the clients for one of the characters does not coincide, determines the next resurrection point of one of the characters as the next resurrection point for each of the characters included within the party.

9. A game system according to claim 8, wherein the game processor determines the one of the characters based upon a game executed by the clients.

10. A game system according to claim 1, further comprising:
a text information display that displays text information inputted to the clients on the display of each of the clients when the resurrection point of each of the characters is displayed.

11. A game system according to claim 10, wherein the text information display displays the text information on the display of each of the clients for a predetermined period of time.

12. A non-transitory computer-readable medium including a program for an on-line game system, the on-line game system including a game server and at least one computer connected through an information communication network, in which characters existing within a virtual space provided by the game server are subjected to manipulation clients, the program causing the computer to operate in a manner to include:
a party storage for storing party information relating to a party within which the characters are included;

a condition storage for storing a game over condition for which each of the characters in the party is placed in game over state;

a resurrection point storage for storing a resurrection point for each of the characters included within the party;

a determiner for determining, by making reference to the party storage and the condition storage, whether the game over condition for which the party is placed in the game over state is satisfied;

a resurrection point extractor operative to, when the determiner determines that the game over condition is satisfied, extract the resurrection point of each of the characters included within the party from the resurrection point storage;

a resurrection point display operative to display the resurrection point extracted for each of the characters by the resurrection point extractor on a display of each of the clients, which perform manipulation of the characters included within the party, to hasten a selection of a next resurrection point for each of the characters; and a resurrection processor operative to, after the selection of the next resurrection point for each of the characters, resurrect each character in the party at the next resurrection point.

13. A non-transitory computer-readable medium according to claim 12, wherein the resurrection point display is operative to display, on the display of each client of the clients, only the resurrection point of each of the characters for which a corresponding one of the characters of the client has gained experience.

14. A non-transitory computer-readable medium according to claim 13, wherein the resurrection point display is operative to display, on the display of each client of the clients, a predetermined symbol instead of the resurrection point of each of the characters for which the corresponding one of the characters of the client has not gained experience.

15. A non-transitory computer-readable medium according to claim 12, wherein one of the clients performs the selection of the next resurrection point for each of the characters.

16. A non-transitory computer-readable medium according to claim 12, wherein each of the clients performs the selection of the next resurrection point for one of the characters.

17. A non-transitory computer-readable medium according to claim 16, wherein the program further causes the computer to operate in the manner to include:
a game processor that, when the selection of the next resurrection point by each of the clients for one of the characters does not coincide, determines the next resurrection point of one of the characters as the next resurrection point for each of the characters included within the party.

18. A non-transitory computer-readable medium according to claim 17, wherein the game processor determines the one of the characters based upon a game executed by the clients.

19. A non-transitory computer-readable medium according to claim 12, wherein the program further causes the computer to operate in the manner to include:
a text information display that displays text information inputted to the clients on the display of each of the clients when the resurrection point of each of the characters is displayed.

20. A non-transitory computer-readable medium according to claim 19, wherein the text information display displays the text information on the display of each of the clients for a predetermined period of time.

* * * * *